United States Patent
Atkinson (10) Patent No.: US 9,927,855 B2
(45) Date of Patent: Mar. 27, 2018

(54) POWER STATE CONTROL SIGNAL

(71) Applicant: HEWLETT-PACKARD DEVELOPMENT COMPANY, L.P., Houston, TX (US)

(72) Inventor: Lee Warren Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/030,270

(22) PCT Filed: Jan. 27, 2014

(86) PCT No.: PCT/US2014/013244
§ 371 (c)(1),
(2) Date: Apr. 18, 2016

(87) PCT Pub. No.: WO2015/112180
PCT Pub. Date: Jul. 30, 2015

(65) Prior Publication Data
US 2016/0320819 A1  Nov. 3, 2016

(51) Int. Cl.
*G06F 1/26* (2006.01)
*G06F 1/32* (2006.01)
*G06F 1/28* (2006.01)

(52) U.S. Cl.
CPC ............. *G06F 1/28* (2013.01); *G06F 1/26* (2013.01); *G06F 1/266* (2013.01); *G06F 1/3296* (2013.01)

(58) Field of Classification Search
CPC .......... G06F 1/266; G06F 1/26; G06F 1/3296; G06F 1/28
See application file for complete search history.

(56) References Cited

U.S. PATENT DOCUMENTS

| | | | |
|---|---|---|---|
| 5,862,349 A * | 1/1999 | Cho | ............... G06F 1/1632 710/304 |
| 6,308,278 B1 | 10/2001 | Khouli et al. | |
| 6,668,296 B1 | 12/2003 | Dougherty et al. | |
| 6,708,278 B2 | 3/2004 | Howard et al. | |
| 7,360,004 B2 | 4/2008 | Dougherty et al. | |
| 8,572,420 B2 | 10/2013 | Dutton et al. | |
| 2004/0148445 A1 | 7/2004 | Lee et al. | |

(Continued)

FOREIGN PATENT DOCUMENTS

| | | |
|---|---|---|
| CN | 102867500 A | 1/2013 |
| CN | 103425613 A | 12/2013 |
| TW | 201104398 A1 | 2/2011 |

OTHER PUBLICATIONS

"How to Turn on Laptop Without Using Power Button", Aug. 26, 2011, Retrieved on Sep. 19, 2013 <URL: http://www.techsupportforum.com/forums/f108/solved-how-to-turn-on-laptop-without-using-power-button-596690.html>.

(Continued)

*Primary Examiner* — Stefan Stoynov
(74) *Attorney, Agent, or Firm* — HP Inc Patent Department (57) ABSTRACT

A device including a data bus port to receive power from an external source. A controller can monitor the power terminals of the data bus port for a power state control signal. The controller may determine if a second controller on an external source generated a power state control signal transmitted through the power terminals providing power to the computing device in response to activation of a power button on the external source.

14 Claims, 8 Drawing Sheets

(56) References Cited

U.S. PATENT DOCUMENTS

| | | |
|---|---|---|
| 2007/0180174 A1* | 8/2007 | Moosavi ............... G06F 13/426 710/106 |
| 2009/0210519 A1 | 8/2009 | Zill et al. |
| 2010/0007473 A1* | 1/2010 | Fadell .................. G06F 13/426 713/300 |
| 2010/0042861 A1 | 2/2010 | Lee |
| 2010/0217911 A1 | 8/2010 | Sisto et al. |
| 2011/0055434 A1 | 3/2011 | Pyers et al. |
| 2012/0203949 A1* | 8/2012 | Benhard ................ G06F 13/14 710/303 |
| 2013/0013936 A1 | 1/2013 | Lin et al. |
| 2013/0205060 A1 | 8/2013 | Benhard et al. |

OTHER PUBLICATIONS

"Turn on Laptop From Sleep Mode Without Opening the Lid of the Laptop (Docking station)", Jan. 9, 2011. Retrieved on Sep. 19, 2013 <URL: https://forums.lenovo.com/t5/ThinkPad-T400-T500-and-newer-T/Turn-on-laptop-from-sleep-mode-without-opening-the-lid-of-the/ta-p/351789>.

"Turn on Laptop Without Opening Lid (no Dock)",Sep. 29, 2009. Retrieved on Sep. 19, 2013 <URL: http://forum.notebookreview.com/threads/turn-on-laptop-without-opening-lid-no-dock.421290/>.

* cited by examiner

POWER STATE CONTROL SIGNAL

BACKGROUND

Universal serial bus (USB) was a design to standardize the connection of computer peripherals including keyboards, pointing devices, digital cameras, printers, portable media players, disk drives, network adapters and other peripherals to computing devices, both to communicate and to supply electric power. Computing devices include devices such as notebooks, desktops, smartphones, PDAs and video game consoles.

BRIEF DESCRIPTION OF THE DRAWINGS

Some examples of the invention are described with respect to the following figures.

DETAILED DESCRIPTION

Many computing devices use more power to operate than can be provided by Universal Serial Bus (USB) standards such as 2.0 or 3.0. For example many notebooks operate on 45 to 90 watt power supplies. The power supplies for notebooks computers use an electrical connector that is separate from the USB port on the notebook. Universal Serial Bus Power delivery (USB-PD) was introduced so that a notebook could receive the power levels it uses while also sending and receiving data using one cable and one USB-PD port on the computing device. This allows a portable computing device to connect to an external source such as a docking station for example through a single cable and still receive power from the docking station.

In USB Power Delivery, pairs of directly attached ports negotiate voltage, current and/or direction of power flow over the power conductor (VBUS). The negotiations are done by sending and receiving signals on the power conductor (VBUS) rather than the data conductors of the USB connection. The USB Power Delivery system has a communications stack that includes a device policy manager, policy engine, protocol, and a physical layer. The Protocol Layer forms the messages used to communicate information between a pair of ports. It receives inputs from the Policy Engine indicating which messages to send and indicates the responses back to the Policy Engine. The Physical Layer is responsible for sending and receiving messages across VBUS and includes a transceiver that superimposes a signal on the VBUS wire.

A docking station may be a device to which a portable computer is connected so that it can be used like a desktop computer, with an external power supply, monitor, data transfer capability, and other capabilities. A docking station may be connected to peripherals, for example as input device such as a keyboard or a mouse, a display and a power supply although a docking station may be connected to more or fewer peripherals. By connecting a portable computing device to the docking station the computing device can have access to the peripherals connected to the docking station. In the case of a notebook for example, the notebook may not be opened for operation when the notebook is connected to a docking station because the display and the keyboard of the notebook computer would be replicated by peripherals connected to the docking station. Notebook computers often have the power button near the keyboard and if the notebook is not opened to access the keyboard or display the power button may not be accessible. A power button to operate the computer can be included in the docking station, however if the computing device is connected to a docking station through a USB power delivery connection, the system may have a dedicated way to wake the system up from a low power state. In one implementation the power button on the docking station can cause the protocol layer of the USB power delivery system to generate a message that is received by the controller implementing USB power delivery on the computing device. The message may be a vendor defined message. The controller on the computing device can then cause the computing device to transition from a low power state to another power state. The power states may be, for example, one or more of the advanced configuration and power interface (ALPI) power states.

In an example implementation, a device includes a data bus port to receive power from an external source. A controller can monitor the power terminals of the data bus port for a power state control signal. The controller may determine if a second controller on an external source generated a power state control signal transmitted through the power terminals providing power to the computing device in response to activation of a power button on the external source.

In another implementation, an external source includes a docking port to connect to a computing device and a power button. The docking port includes power terminals and signal terminals. A controller can generate signals on the power terminals of the docking port the controller is to generate a power state control signal to transmit through the power terminals providing power to the computing device in response to activation of a power button.

In another implementation, a system can include a docking station having a docking station controller. A computing device can have a computing device controller. A cable can connect the docking station and the computing device. A power button attached to the docking station can generate a power state signal that is transmitted by the docking station controller over the power lines of the cable to the computing device controller.

Figure 1:
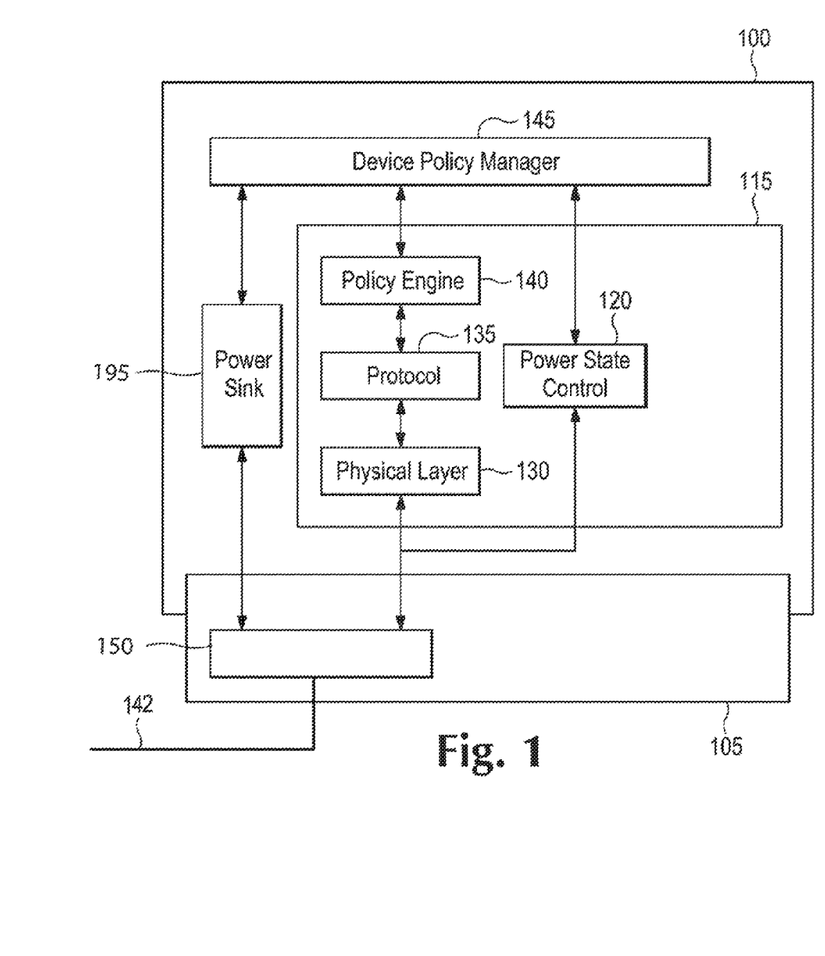
FIG. 1 is a block diagram of computing device according to an example implementation.

With reference to the figures, FIG. 1 is a block diagram of a computing device according to an example implementation. A computing device 100 can include a data bus port 105 to receive power from an external source. The data bus port may be a USB power delivery port for example. A data bus port can include power terminals and data signal terminals. For example Universal serial bus port may have power terminals of positive voltage and ground and data signal terminals of +Data and –Data. The power from the power terminals can be used for supplying power to the components of the device such as a display, storage device, processor, for battery charging or other power uses. The data signal terminals are to send and receive data. The data bus port 105 may be connected to a controller 115.

The controller 115 can monitor the power terminals 150 of the data bus port for a power state control signal. The power terminals 150 of the data bus port may be known as the VBUS for example. The power state control signal can be embedded (or superimposed) on the VBUS.

The controller 115 can determine if a power button on an external source providing power to the computing device has been activated from the power state control signal transmitted through the power terminals 150 that provide power from an external source connected by cable 142. For example, if the external source is a docking station which includes a power button, then that power button can cause the docking station to generate a power state control signal when the power button is activated. The power state control signal may be received by the physical layer 130 and the message interpreted by the protocol layer 135. The policy engine 140 can then apply a policy to the power state control signal message 120. The controller 115 can then cause the device policy manager 145 to cause the system to change from a first power state to a second power state. The first power state may be a low power state such as off, sleep, hibernation or other low power state and the second power state may be an operational power state. In the low power states at least one of the system components such as a processor is turned off to save power. In an operational state the system processor is powered.

Figure 2:
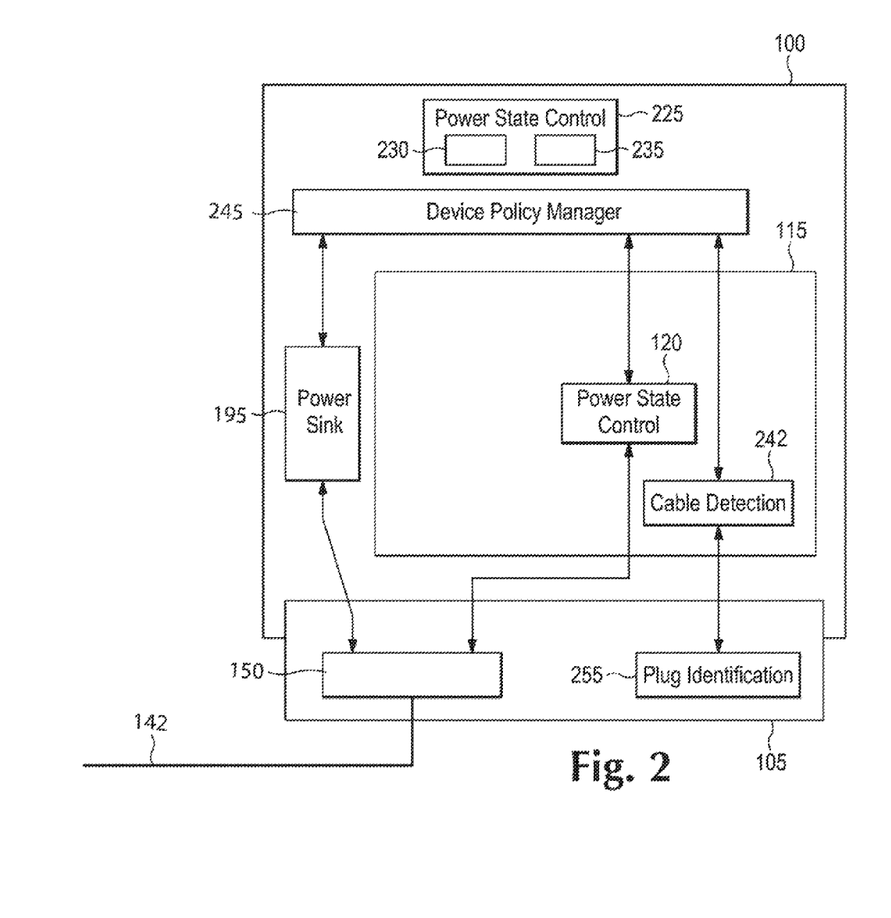
FIG. 2 is a block diagram of computing device and power supply according to an example implementation.

FIG. 2 is a block diagram of a computing device and power supply according to an example implementation. The computing device 100 can include a power state control 225 which can include a low power state 230 and an operational state 235. When the computing device is in a low power state the controller 115 may not be receiving power from a battery or other source in the computing device. When the USB power delivery cable 142 is connected to the USB port and is receiving power from the external source through the USB power delivery cable then the controller may receive power from the external source to power the controller before the device wakes from a low power state.

The power state control may be in the computing device. For example the computing device may determine which power state to transition to based on the current power state. For example the controller may causes the device to either enter a low power state if the computing device is in an operational state or enter an operational power state if the computing device is in a low power state.

The controller can communicate with a second controller on the external source. For example the controller 115 and a second controller can negotiate the voltage, current and/or direction of power flow over the power conductor such as the VBUS. The VBUS 150 can be connected to a Power Sink 195, the power sink can be any load in the computing device 100.

The controller 115 can detect the type of cable connected to the data bus port 105 by the cable detection logic 242 connected to the plug identification 255 of the data bus port 105. The data bus port may be compatible with various types of cables however not all types of cables be able to supply power in accordance with all of the USB power delivery profiles.

When the controller detects the type of cable connected the data bus port it can negotiate with a second controller on the external source to determine the amount of power supplied to the computing device. This power supplied by the external source could be the standard USB power that does not rise above a threshold of 5 volts or 1.5 amps. When the cable type is capable of raising above a threshold amount the negotiations may cause power to be delivered according to a power profile such as 10 W, 16 W, 36 W, 60 W, and 100 W.

Figure 3:
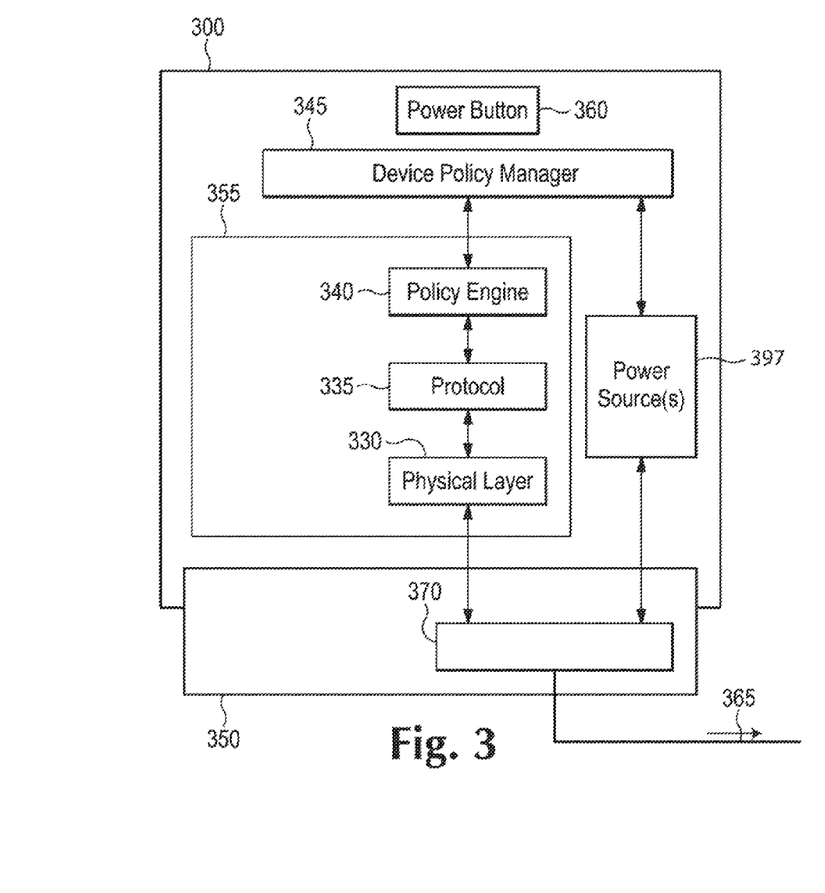
FIG. 3 is a block diagram of an external source according to an example implementation.

FIG. 3 is a block diagram of an external source according to an example implementation. The external source 300 can include a docking port 350 to connect to a computing device. The docking port 350 can be a data bus port. The docking port 350 can include power terminals 370 and data terminals. The controller 355 can generate signals on the power terminals 370 of the docking port. Power can be supplied to the power terminals from a power source 397.

The external source 300 can include a power button 360 to cause the controller 355 to generate a power state control signal 365 to be sent through the power terminals 370 of the docking port 350 to the computing device. The controller can include a policy engine 340 connected to the device policy manager 345, a protocol layer 335 connected to the policy engine 340 and a physical layer 330 connected to the protocol layer 335. The protocol layer 335 can generate the power state control signal message. The power state control signal message can then go to the physical layer 330, the docking port 350 and then the power terminals 370 to travel on the USB power delivery cable to a computing device.

In one example implementation, the controller on the external source recognizes the power status of the external source and generates a message of this status to the computing device. The computing device recognizes the power status of the external source and makes the power status of the computing device match the external source. For example if the external source is a docking station in a display device and the display is On then the computing device becomes active. If the display is Off, the computing device transitions to a low power state.

Figure 4:
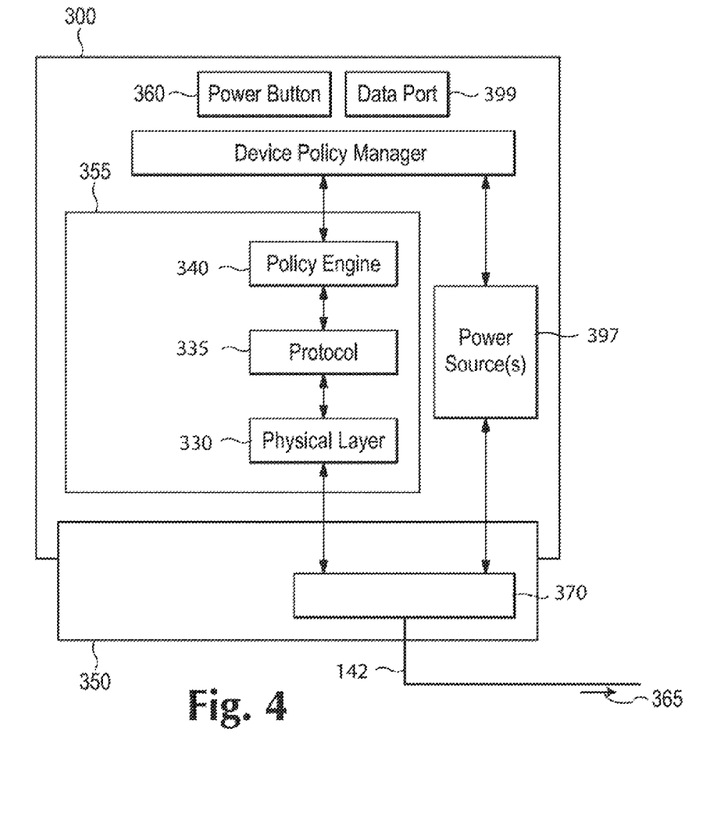
FIG. 4 is a block diagram of an external source according to an example implementation.

FIG. 4 is a block diagram of an external source according to an example implementation. The docking port 350 of the external source 300 can connect to a data cable 142.

The external source 300 may include another data port 399 to electrically connect a peripheral device to the external source for communication with the computing device through the docking port. The data port 399 may be for example another USB power delivery port, another type of USB port, a video output port such as a High-Definition Multimedia Interface (HDMI) port or another port. The data port 399 may connect to a peripheral such as a keyboard, mouse, display or another peripheral.

When the controller 355 detects the type of cable connected to the docking port 350 it can negotiate with a controller on a computing device to determine the amount of power supplied to the computing device. This power supplied by the external source could be the standard USB power that does not rise above a threshold of 5 volts or 1.5 amps. When the cable type is capable of raising above a threshold amount the negotiations may cause power to be delivered according to a power profile such as 10 W, 18 W, 36 W, 80 W, and 100 W to the computing device.

Figure 5:
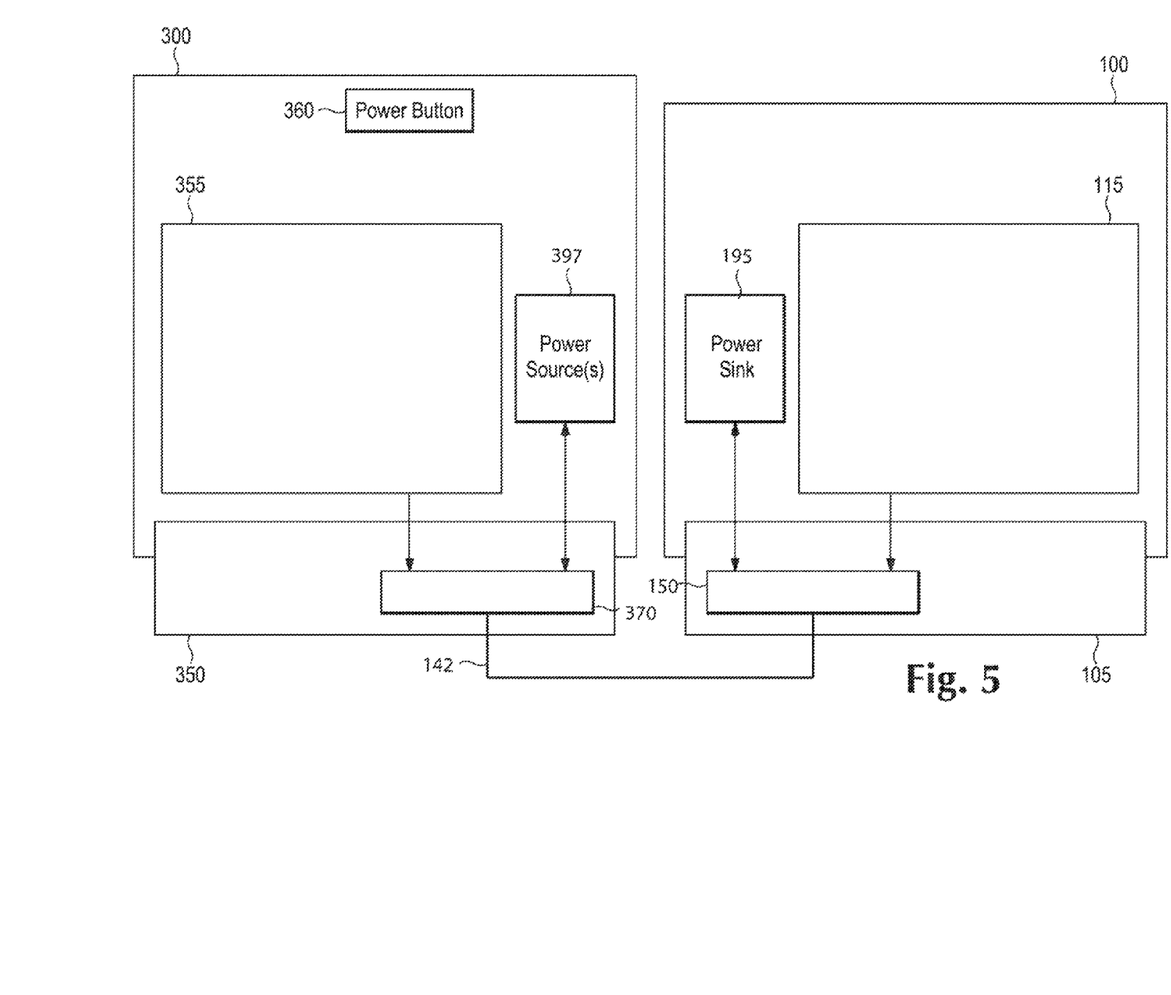
FIG. 5 is a block diagram of a system according to an example implementation.

FIG. 5 is a block diagram of a system according to an example implementation. The system can include an external source 300 having an external source controller 355 and a computing device 100 having a computing device controller 115.

A cable 142 can connect the external source 355 and the computing device 115. A power button 360 can be attached to the external source to generate a power state signal that is transmitted by the external source controller 335 over the power lines of the cable 142 to the computing device controller 115.

Figure 6:
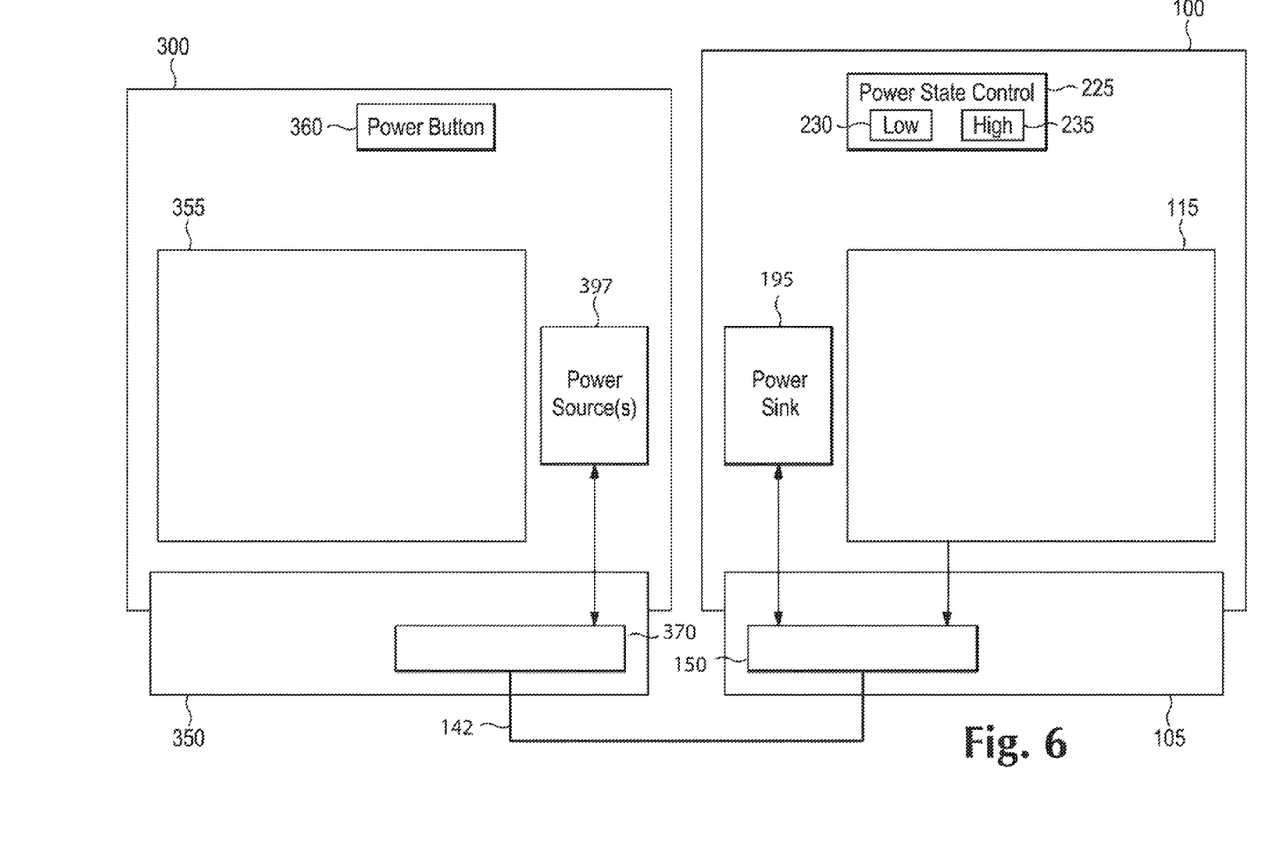
FIG. 6 is a block diagram of a system according to an example implementation.

FIG. 6 is a block diagram of a system according to an example implementation. The system uses a power state signal transmitted on the cable 142 that can cause the computing device to enter a low power state 230 or an operational state 235.

The system can include an external source controller 355 and a computing device controller 115 that together negotiate an amount of power to be supplied to the computing device 100 by the power lines of the cable 142.

Figure 7:
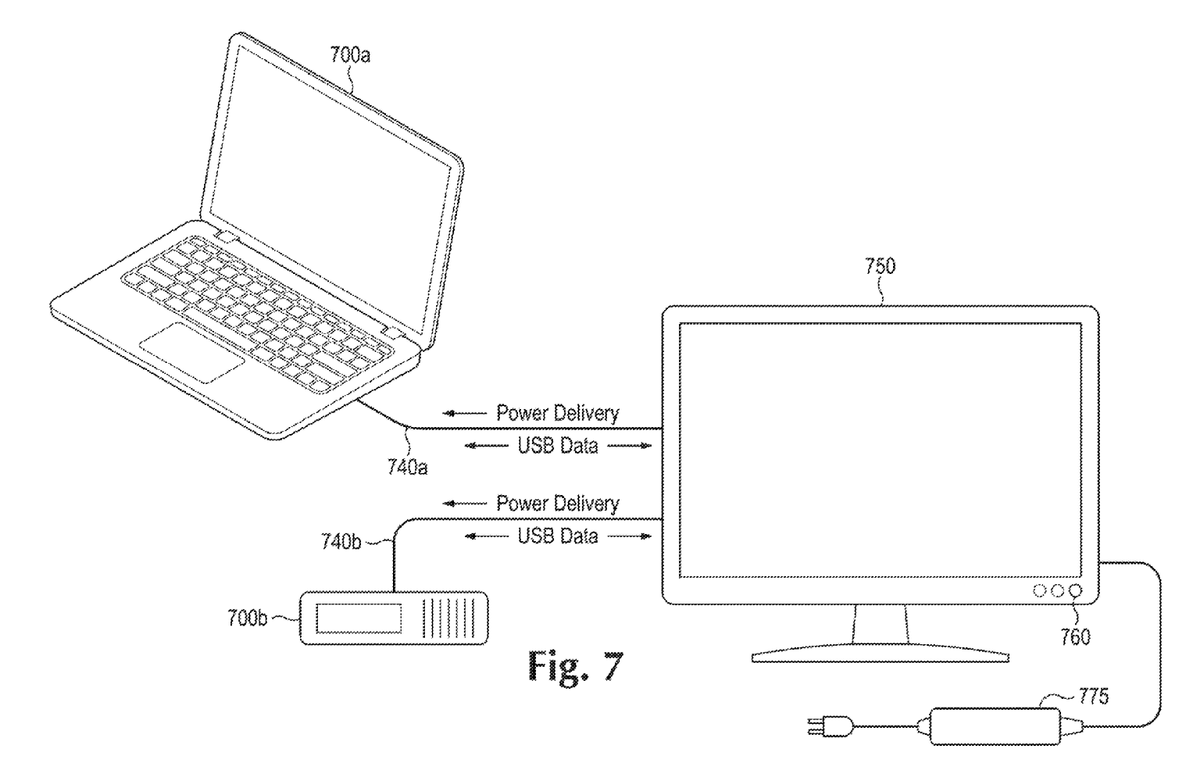
FIG. 7 is a diagram of a system according to an example implementation.

FIG. 7 is a diagram of a system according to an example implementation. FIG. 7 includes a device such as a notebook 700a or a storage device 700b such as an external hard drive. The devices 700a or 700b can be connected to an external source such as an external source 750. The external source may be a standalone external source or may be a docking station and may be combined with other peripheral devices, for example the external source 750 may be part of a display device such as an Liquid crystal display LCD. Organic light emitting diode OLED, or another technology. The power notebook 700a may be connected to the external source 750 through a USB power delivery cable 740a. The storage device 700b may be connected to the external source 750 through a USB power delivery cable 740b.

The external source includes a power button 760 to control the power state of at least one of the devices 700a and 700b. The external source may include multiple power buttons that can each control the power states of the peripherals connected to the external source 750. The power button may be programmed in the external source to provide a power state signal to any combination of devices for example to either device 700a, 700b or both devices 700a and 700b.

The external source may be supplied power from an external power supply 775. The external power supply 775 may be an AC/DC converter. The external power supply may connect to the external source 750 via a USB power delivery port or another port. The external source 750 can negotiate with the devices to determine the voltage, current and direction of the power delivery when the external source 750 is connected to the device 700a or 700b by cables 700a or 700b. When the external power supply 775 is supplying power to the external source the external source may negotiate to supply power to the device 700a for example. However if the external power supply 775 is not supplying power to the external source the 700a could supply power to the external source 750.

To use the external source 750 a user can connect a USB power delivery port on a device such as a notebook 700a to a USB power delivery port on an external source 750 by a USB power delivery cable 740a. The user can then cause the notebook 700a to enter an operational state by activating the power button 760 on the external source 750. The USB power delivery port can supply power to the device 700a. The power may be used to operate the components of the device 700a, charge a battery or another function. The USB power delivery cable can include data lines that communicate data between the device 700a and the external source 750. The data may be video data for display on a display connected to the external source, receiving data from peripherals connected to the external source or other data.

Figure 8:
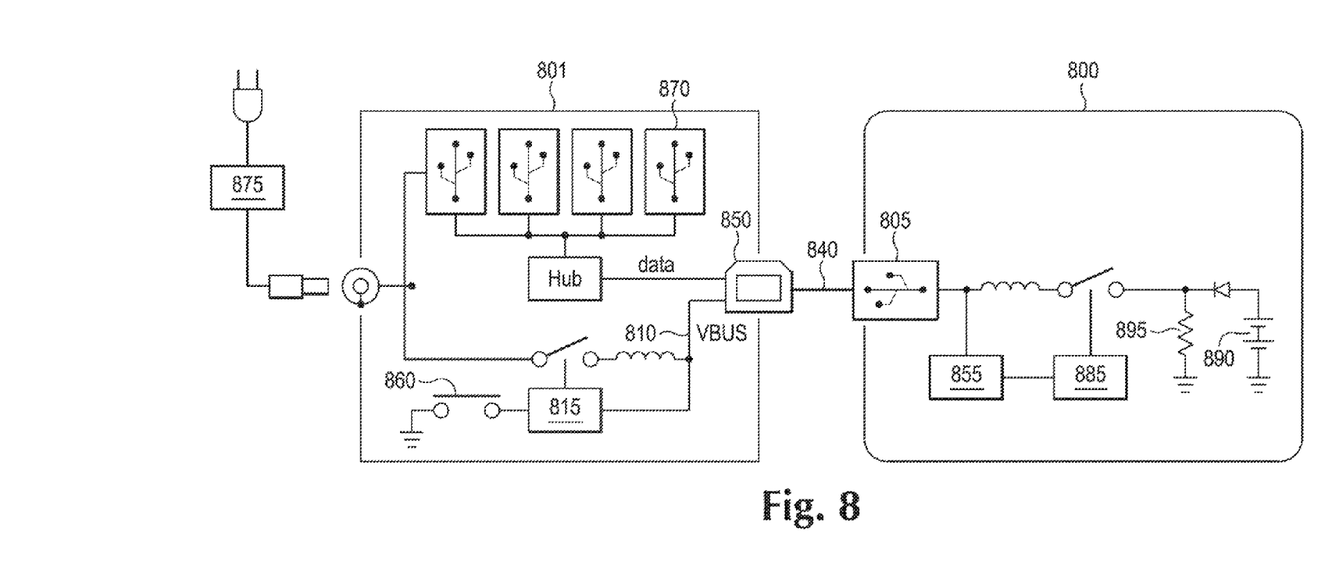
FIG. 8 is a diagram of a system according to an example implementation.

FIG. 8 is a diagram of system according to an example implementation. The system includes an external source 801 such as a docking station. The system can also include a computing device 800 such as a notebook computer. The external source 801 can be connected to the computing device 800 through cable 840. The cable 840 can be a USB power delivery cable. The external source may be connected to a power supply 875 that can convert alternating current power to direct current power that is supplied to the external source 801.

The external source 801 can include a switch 860 that provides an input to the controller 815. The controller 815 can generate a message to be superimposed on the VBUS 810. The VBUS can be connected to the docking port 850. The docking port 850 may include VBUS terminals and also data bus terminals. The data bus terminal may for example connect to other data ports such as a set of USB ports 870.

The computing device 800 can include a data bus port 805 to couple to the cable 840. The data bus port 805 can receive the VBUS from the cable. The power from the VBUS is used to power the loads 895 in the computing system 800 and charge the battery 890. The VBUS received by the data bus port 805 is monitored by controller 855. If the controller 855 receives a message on the VBUS that indicates a power state change the controller 855 can communicate with the power logic 885 to change the power state of the computing device 800. The state change may be from low power state to an operational power state.

The techniques described above may be embodied in a computer-readable medium for configuring a computing system. The computer readable media may include, for example and without limitation, any number of the following non-transitive mediums: magnetic storage media including disk and tape storage media: optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

It is to be understood that the phraseology and terminology used herein is for the purpose of description and should not be regarded as limiting. The use of "comprising", "including" or "having" are synonymous and variations thereof herein are meant to be inclusive or open-ended and do not exclude additional unrecited elements or method steps. It should also be noted that a plurality of hardware and software based devices, as well as a plurality of different structural components may be used to implement the disclosed methods and systems.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
   a data bus port to receive power from an external source; and
   a computing device controller connected to the data bus port to:

monitor power terminals of the data bus port for a power state control signal; and determine if a second controller on the external source generated the power state control signal in response to activation of a power button on the external source, wherein the power state control signal is transmitted through the power terminals providing power to the computing device, wherein the computing device controller includes:
a physical layer; and
a protocol layer having a policy engine, wherein the policy engine includes logic to apply a policy to the power state control signal received from the external source.

2. The computing device of claim 1, wherein the controller receives power from the external source to power the controller before the device wakes from a low power state.

3. The computing device of claim 1, wherein the controller causes the device to either enter a low power state or enter an operational power state.

4. The computing device of claim 1, wherein the external source is docking station.

5. The computing device of claim 1, wherein the controller negotiates a power supply with the second controller external source.

6. The computing device of claim 1, wherein the controller detect a type of cable connected to the data bus port.

7. The computing device of claim 1, wherein the controller detects a type of cable connected to the data bus port and negotiates with the second controller on the external source to determine if an amount of power supplied to the computing device is above a threshold amount.

8. The computing device of 7, wherein threshold amount is one of 5 volts and 1.5 amps.

9. The computing device of claim 1, wherein, in response to receipt of the power state control signal indicating activation of the power button on the external source, the controller transitions the computing device to a different power state from a current power state.

10. The computer device of claim 1, wherein the power state control signal indicates a power state of the external source.

11. The computer device of claim 10, wherein, in response to receipt of the power state control signal, the controller causes a power state of the computing device to match the power state of the external source.

12. A system comprising:
an external source having an external controller and a docking port, wherein the docking port includes power terminals and data signal terminals;
a computing device having a computing device controller and a data bus port wherein the data bus port includes power terminals and data signal terminals to connect to the docking port; and
a power button attached to the external source to generate a power state control signal that is transmitted by the external source controller over the power terminals of the docking port to the computing device controller, wherein the computing device controller includes:
a physical layer; and
a protocol layer having a policy engine, wherein the policy engine includes logic to apply a policy to the power state control signal received from the external source.

13. The system of claim 12, wherein the power state control signal causes the computing device to enter a low power state.

14. The system of claim 12, wherein the external source controller and the computing device controller negotiate an amount of power to be supplied to the computing device by the power lines of the cable.

* * * * *

UNITED STATES PATENT AND TRADEMARK OFFICE
CERTIFICATE OF CORRECTION

| | | |
|---|---|---|
| PATENT NO. | : 9,927,855 B2 | Page 1 of 1 |
| APPLICATION NO. | : 15/030270 | |
| DATED | : March 27, 2018 | |
| INVENTOR(S) | : Atkinson | |

It is certified that error appears in the above-identified patent and that said Letters Patent is hereby corrected as shown below:

In the Claims

Column 7, Claim 6, Line 29, delete "detects" and insert -- detect --, therefor.

Column 7, Claim 8, Line 33, after "of" insert -- claim --, therefor.

Column 7, Claim 8, Line 33, after "wherein" insert -- the --, therefor.

Column 8, Claim 10, Line 4, delete "computer" and insert -- computing --, therefor.

Column 8, Claim 11, Line 7, delete "computer" and insert -- computing --, therefor.

Signed and Sealed this
Tenth Day of July, 2018

Andrei Iancu
*Director of the United States Patent and Trademark Office*